US009154804B2

(12) United States Patent
Concion

(10) Patent No.: US 9,154,804 B2
(45) Date of Patent: Oct. 6, 2015

(54) HINT BASED ADAPTIVE ENCODING

(75) Inventor: Davide Concion, San Jose, CA (US)

(73) Assignee: Apple Inc., Cupertino, CA (US)

(*) Notice: Subject to any disclaimer, the term of this patent is extended or adjusted under 35 U.S.C. 154(b) by 837 days.

(21) Appl. No.: 13/251,089

(22) Filed: Sep. 30, 2011

(65) Prior Publication Data

US 2012/0307887 A1 Dec. 6, 2012

Related U.S. Application Data

(60) Provisional application No. 61/493,451, filed on Jun. 4, 2011.

(51) Int. Cl.
*H04N 7/12* (2006.01)
*H04N 11/02* (2006.01)
*H04N 11/04* (2006.01)
*H04N 19/507* (2014.01)
*H04N 19/167* (2014.01)
*H04N 19/136* (2014.01)
*H04N 19/107* (2014.01)
H04N 19/23 (2014.01)

(52) U.S. Cl.
CPC ........... *H04N 19/507* (2014.11); *H04N 19/107* (2014.11); *H04N 19/136* (2014.11); *H04N 19/167* (2014.11); *H04N 19/23* (2014.11)

(58) Field of Classification Search
CPC ................. H04N 19/00212; H04N 19/00248; H04N 19/0026; H04N 7/26005; H04N 19/00012; H04N 19/00254; H04N 21/44008; H04N 7/50; H04N 7/26244; H04N 7/26271; H04N 7/26053; H04N 7/26941
USPC ....................... 375/240.01–240.27
See application file for complete search history.

(56) References Cited

U.S. PATENT DOCUMENTS

| 7,633,076 | B2 | 12/2009 | Huppi et al. | |
|---|---|---|---|---|
| 7,646,437 | B1 | 1/2010 | Dumitras et al. | |
| 7,809,830 | B2 | 10/2010 | Denoual | |
| 7,826,537 | B2 | 11/2010 | Zhang et al. | |
| 2006/0088105 | A1 | 4/2006 | Shen et al. | |
| 2007/0110153 | A1* | 5/2007 | Cho et al. | 375/240.12 |
| 2008/0089597 | A1* | 4/2008 | Guo et al. | 382/238 |

(Continued)

OTHER PUBLICATIONS

Kopf, Stephan, Wolfgang Effelsberg, "Mobile Cinema—Canonical Processes for Video Adaptation", Dec. 2008, pp. 369-375.

*Primary Examiner* — Andy Rao
*Assistant Examiner* — Jared Walker
(74) *Attorney, Agent, or Firm* — Kenyon & Kenyon LLP

(57) ABSTRACT

A device for encoding video image data includes a data receiver that receives a current image frame to be compressed, the current image frame being composed of a plurality of current macroblocks. An information receiver receives metadata that includes information that identifies static areas within the received current image frame. An encoder encodes each of the plurality of current macroblocks. The encoder encodes a current macroblock that is entirely within the static areas as having no difference from a corresponding preceding macroblock in a preceding frame by using an encoded macroblock that is created without comparing the current macroblock to the corresponding preceding macroblock. The metadata may include information that identifies regular video and graphics within the received current image frame and the encoder may make different compression decisions according to the inclusion of regular video and graphics within the current macroblock.

21 Claims, 2 Drawing Sheets

(56) References Cited

U.S. PATENT DOCUMENTS

| | | |
|---|---|---|
| 2008/0205389 A1 | 8/2008 | Fang et al. |
| 2008/0212682 A1 | 9/2008 | Kalva |
| 2008/0219573 A1* | 9/2008 | Lu .................................. 382/236 |
| 2009/0296811 A1* | 12/2009 | Jeon et al. ................ 375/240.12 |
| 2009/0323809 A1* | 12/2009 | Raveendran ............. 375/240.16 |
| 2010/0309975 A1 | 12/2010 | Zhou et al. |
| 2010/0309987 A1 | 12/2010 | Concion et al. |

* cited by examiner

HINT BASED ADAPTIVE ENCODING

CROSS REFERENCE TO RELATED APPLICATIONS

This application claims the benefit pursuant to 35 U.S.C. 119(e) of U.S. Provisional Application No. 61/493,451, filed Jun. 4, 2011, which application is specifically incorporated herein, in its entirety, by reference.

BACKGROUND

1. Field

Embodiments of the invention relate to the field of encoding video data; and more specifically, to increasing the efficiency of the video data encoding device.

2. Background

Electronic devices such as personal computers, digital assistants, media players, wireless communication devices, and the like typically include a visual display unit to provide visual displays to a user. The visual displays may display video content which is a large number of still images displayed in rapid succession to provide a moving image. The video content may be transmitted to the electronic device or be provided on a storage medium. The video content will typically be encoded to reduce the size of the data before transmission or storage. Data compression can be a time consuming aspect of the encoding process.

It would be desirable to provide a mechanism that can reduce the time required for data compression during encoding of video data.

SUMMARY

A device for encoding video image data includes a data receiver that receives a current image frame to be compressed, the current image frame being composed of a plurality of current macroblocks. An information receiver receives metadata that includes information that identifies static areas within the received current image frame. An encoder encodes each of the plurality of current macroblocks. The encoder encodes a current macroblock that is entirely within the static areas as having no difference from a corresponding preceding macroblock in a preceding frame by using an encoded macroblock that is created without comparing the current macroblock to the corresponding preceding macroblock. The metadata may include information that identifies regular video and graphics within the received current image frame and the encoder may make different compression decisions according to the inclusion of regular video and graphics within the current macroblock.

Other features and advantages of the present invention will be apparent from the accompanying drawings and from the detailed description that follows below.

BRIEF DESCRIPTION OF THE DRAWINGS

The invention may best be understood by referring to the following description and accompanying drawings that are used to illustrate embodiments of the invention by way of example and not limitation. In the drawings, in which like reference numerals indicate similar elements.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

Figure 1:
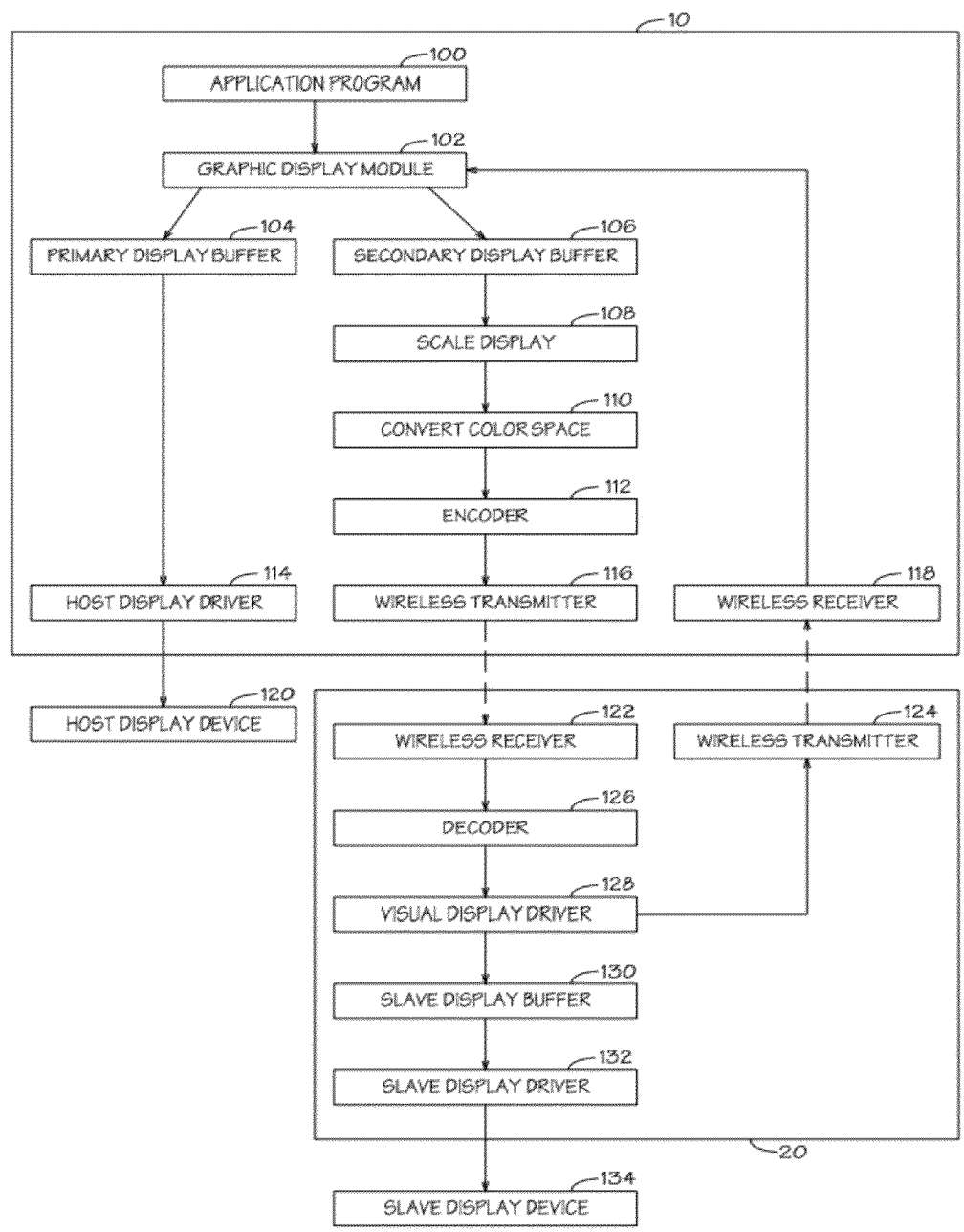
FIG. 1 is a block diagram of a host device and a slave device that embody the invention.

FIG. 1 shows a block diagram of a host device 10 and a slave device 20 that embody the invention. An application program 100 is executed by a processing unit on the host device 10. The application program 100 generates a visual display by communicating graphics commands to a graphic display module of 102 that is also executed by the processing unit on the host device 10.

The graphic display module 102 assembles graphic data in buffers 104, 106 to create a visual display on visual display devices 120, 134. In the implementation illustrated, a primary display buffer 104 is used to create a visual display that is local to the host device 10. The host display driver on 114 communicates the graphic data from the primary display buffer 104 to the host display device 120.

A secondary display buffer 106 is used to create a visual display on a slave display device 134 that is driven by a slave device 20 that receives graphic data from the host device 10 over a wireless communications link. On the host device 10 the secondary display buffer 106 may be scaled 108 to produce a display of an appropriate size for the slave display device 134. The image data may be encoded 112 to compress the data that is transmitted to the slave device 20. The encoding may require a color space conversion 110 prior to encoding. The graphic data is transmitted by a wireless transmitter 116 on the host device 10.

Processes for displaying graphic content are described in pending U.S. Provisional Patent Application Nos. 61/431,776 and 61/493,451, which are assigned to the assignee of the present application, and which are incorporated herein, in their entirety by reference.

The slave device 20 receives the graphic data on a wireless receiver 122. If the data has been encoded, it is then decoded 126 by the slave device 20. A visual display driver 128 receives the graphic data and assembles it in a slave display buffer 130. A slave display driver 132 communicates the graphic data from the slave display buffer 130 to the slave display device 134.

Figure 2:
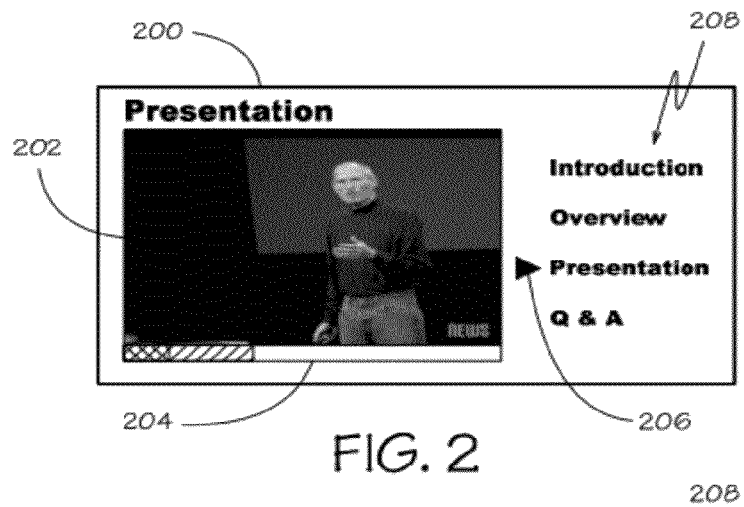
FIG. 2 is a visual display that may be produced by an embodiment of the invention.

FIG. 2 shows a visual display 200 that may be created by the graphic display module 102 for display on the slave display device 134. The visual display 200 illustrated includes several graphic elements including a moving video image 202, a progress bar 204, text elements 208, and a cursor 206 indicating a selection.

Figure 3:
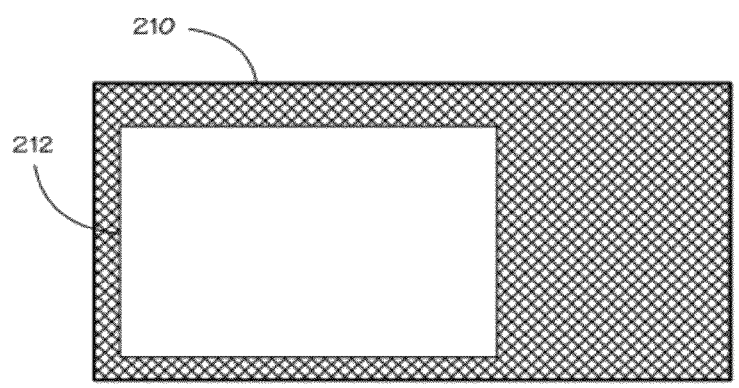
FIG. 3 is a representation of metadata that may be attached to the visual display of FIG. 10.

FIG. 3 is a graphical representation of metadata 210 that may be provided with an image frame for the visual display shown in FIG. 10. The cross hatched areas represent areas that are indicated as being static. The portion of the display occupied by the video content 212 is not indicated as being static because it changes from frame to frame and therefore the encoder must analyze that portion of the visual display. It will be appreciated that portions of the video content 212 may in fact be static but it is necessary for the encoder to do the normal processing of the video content to determine if there are static areas.

Figure 4:
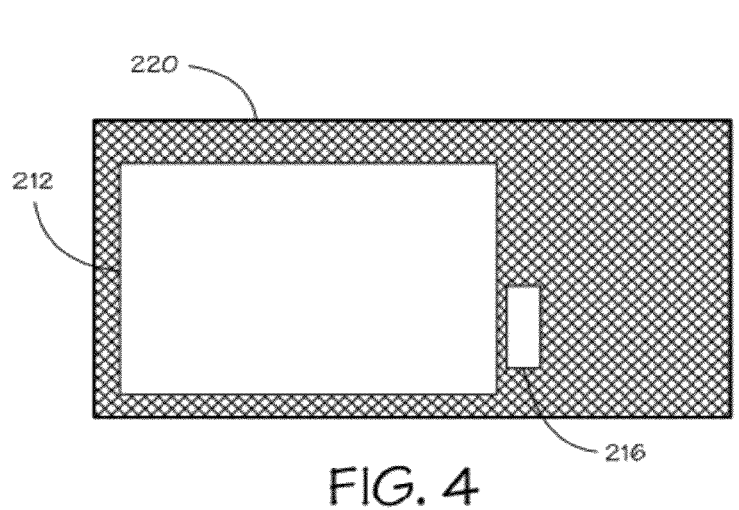
FIG. 4 is another representation of metadata that may be attached to the visual display of FIG. 10.

FIG. 4 is a graphical representation of metadata 220 when the cursor 206 is being moved. It will be seen that an additional area 216 is now removed from the areas that are indicated as being static. The host graphic display module 102 determines which in areas of the composited image are static during the compositing process.

To reduce bandwidth required for transmission and/or space required for storage of video image data, the image data may be compressed by an encoder 112. An encoder that embodies the invention, such as an H.264 encoder that embodies the invention, receives metadata along with an image frame to be compressed. The metadata includes information that identifies static areas within the image frame. The metadata may give information about static areas and also about which part of the image frame is "regular video" (ex. a movie) or "graphics" (synthetic images) or both (ex. overlays . . . ). In the case of a synthetic macroblock, the encoder will make different compression decisions (ex. limiting the quantization step to better preserve quality . . . ).

The H.264 encoder encodes a current macroblock that is entirely within the static areas as having no difference from a corresponding macroblock in a preceding frame by using a macroblock that is created without comparing the current macroblock to the corresponding preceding macroblock. For example, in the H.264 context, a static macroblock for which all of the following conditions are fulfilled may be used to encode a macroblock that is entirely within an area identified as static by the metadata:

1) CodedBlockPatternLuma and CodedBlockPatternChroma are both equal to 0, and,
2) either of the following conditions are fulfilled:
   a. mb_type is equal to P_Skip or P_L0_16×16 and weighted_pred_flag is not equal to 1, or,
   b. mb_type is equal to B_Skip, B_Direct 16×16, B_L0_16×16, or B_L1_16×16 and weighted_bipred_idc is not equal to 1;
3) only a single list X for X=0 or 1 (List 0 or List 1) is used in the inter prediction process for the macroblock, within which the values of mvLX[0], mvLX[1], and refIdxLX are all equal to 0, and,
4) either of the following conditions are fulfilled:
   a. the macroblock is a frame macroblock and the reference index value 0 refers to the immediately-preceding frame or complementary field pair in decoding order and the immediately-preceding picture in decoding order is not a non-paired field, or,
   b. the macroblock is a field macroblock and the reference index value 0 refers to the immediately-preceding field of the same parity in decoding order.

It will be appreciated that an encoder that embodies this aspect of the invention is not limited to use for encoding a stream of image frames being sent to a wireless display. Any stream of image frames that includes metadata to indicate the static areas of an image frame can use this inventive technique to increase the efficiency of the encoding process. It will be further appreciated that any encoder that compresses a stream of image frames by encoding a portion of the image based on changes from a preceding image can use this inventive technique to increase the efficiency of the encoding process.

While certain exemplary embodiments have been described and shown in the accompanying drawings, it is to be understood that such embodiments are merely illustrative of and not restrictive on the broad invention, and that this invention is not limited to the specific constructions and arrangements shown and described, since various other modifications may occur to those of ordinary skill in the art. The description is thus to be regarded as illustrative instead of limiting.

What is claimed is:

1. A device for encoding video image data, the device comprising:
    a data receiver that receives a current image frame to be compressed, the current image frame being composed of a plurality of current macroblocks;
    an information receiver that receives metadata that includes information that identifies static areas within the received current image frame;
    an encoder that encodes each of the plurality of current macroblocks, wherein when the metadata identifies a current macroblock as being entirely within the static areas, the encoder codes the current macroblock using the metadata as having no difference from a corresponding macroblock in a preceding frame, the encoded macroblock being generated without comparing the current macroblock to the corresponding preceding macroblock.

2. The device of claim 1 wherein the encoded macroblock fulfills one of the following conditions:
    the encoded macroblock is a frame macroblock and a reference index value 0 refers to the preceding frame;
    the encoded macroblock is a frame macroblock, the reference index value 0 refers to a complementary field pair in decoding order, and a preceding field in decoding order is not a non-paired field;
    the encoded macroblock is a field macroblock and the reference index value 0 refers to the preceding field in decoding order of a same parity.

3. The device of claim 1 wherein the encoder further encodes a current macroblock that is not entirely within the static areas by comparing the current macroblock to the corresponding preceding macroblock.

4. The device of claim 3 wherein the metadata further includes information that identifies regular video and graphics within the received current image frame and the encoder further makes different compression decisions according to the inclusion of regular video and graphics within the current macroblock.

5. A method for encoding video image data, the method comprising:
    receiving a current image frame to be compressed, the current image frame being composed of a plurality of current macroblocks;
    receiving metadata that includes information that identifies static areas within the received current image frame;
    encoding each of the plurality of current macroblocks, wherein when the metadata identifies a current macroblock as being entirely within the static areas, encoding the current macroblock using the metadata as having no difference from a corresponding macroblock in a preceding frame, the encoded macroblock being generated without comparing the current macroblock to the corresponding preceding macroblock.

6. The method of claim 5 wherein the encoded macroblock fulfills one of the following conditions:
    the encoded macroblock is a frame macroblock and a reference index value 0 refers to the preceding frame;
    the encoded macroblock is a frame macroblock, the reference index value 0 refers to a complementary field pair in decoding order, and a preceding field in decoding order is not a non-paired field;

the encoded macroblock is a field macroblock and the reference index value 0 refers to the preceding field in decoding order of a same parity.

7. The method of claim 5 further comprising encoding a current macroblock that is not entirely within the static areas by comparing the current macroblock to the corresponding preceding macroblock.

8. The method of claim 7 wherein the metadata further includes information that identifies regular video and graphics within the received current image frame and encoding the current macroblock that is not entirely within the static areas uses different compression decisions according to the inclusion of regular video and graphics within the current macroblock.

9. A device for encoding video image data, the device comprising:
   means for receiving a current image frame to be compressed, the current image frame being composed of a plurality of current macroblocks;
   means for receiving metadata that includes information that identifies static areas within the received current image frame;
   means for encoding each of the plurality of current macroblocks, wherein when the metadata identifies a current macroblock as being entirely within the static areas, encoding the current macroblock using the metadata as having no difference from a corresponding macroblock in a preceding frame, the encoded macroblock being generated without comparing the current macroblock to the corresponding preceding macroblock.

10. The device of claim 9 wherein the encoded macroblock fulfills one of the following conditions:
   the encoded macroblock is a frame macroblock and a reference index value 0 refers to the preceding frame;
   the encoded macroblock is a frame macroblock, the reference index value 0 refers to a complementary field pair in decoding order, and a preceding field in decoding order is not a non-paired field;
   the encoded macroblock is a field macroblock and the reference index value 0 refers to the preceding field in decoding order of a same parity.

11. The device of claim 9 further comprising means for encoding a current macroblock that is not entirely within the static areas by comparing the current macroblock to the corresponding preceding macroblock.

12. The device of claim 11 wherein the metadata further includes information that identifies regular video and graphics within the received current image frame and the means for encoding the current macroblock that is not entirely within the static areas uses different compression decisions according to the inclusion of regular video and graphics within the current macroblock.

13. The device of claim 1, wherein the video image data and metadata are generated from a common source.

14. The device of claim 1, wherein the metadata is generated prior to video processing of the encoder.

15. The device of claim 1, wherein the metadata is generated prior to video processing of the encoder.

16. The device of claim 1, wherein the encoder assigns a SKIP coding mode to the macroblock that is coded as having no difference from the corresponding macroblock in the preceding frame.

17. The device of claim 1, wherein when the metadata identifies a current macroblock is not entirely within the static area, the encoder codes the respective macroblock according to a default coding process of the encoder.

18. The host device of claim 1, wherein a first non-static area corresponds to a video display section and a second non-static area corresponds a cursor display section.

19. A video coding system, comprising:
   a video source providing a video sequence to be coded and metadata identifying a region within a frame of the video sequence that contains static image content, each frame of the video sequence having been parsed into a plurality of blocks for coding;
   an encoder that encodes each of the blocks of a frame, wherein
      when the metadata identifies that a block is located entirely within the region of static content, the encoder codes the respective block as having no difference from a corresponding block of a preceding frame without comparing the respective block to the corresponding block of the preceding frame, and
      when the metadata identifies that block is not located entirely within the region of static content, the encoder codes the respective block according to a default coding process of the encoder.

20. The device of claim 1, wherein the encoder scales each of the plurality of current macroblocks to produce image data of an appropriate size for a remote device.

21. The device of claim 1, wherein static areas correspond to computer generated video, and non-static areas correspond to non-computer generated video.

* * * * *